United States Patent [19]

von Hagel et al.

[11] 4,142,970

[45] Mar. 6, 1979

[54] METHOD AND APPARATUS FOR MECHANICALLY AND CHEMICALLY TREATING LIQUIDS

[75] Inventors: Günter von Hagel, Aarbergen; Norbert Berlenbach, Wiesbaden-Dotzheim, both of Fed. Rep. of Germany

[73] Assignee: Passavant-Werke, Hutte, Fed. Rep. of Germany

[21] Appl. No.: 309,905

[22] Filed: Nov. 27, 1972

Related U.S. Application Data

[63] Continuation-in-part of Ser. No. 296,775, Oct. 12, 1972, abandoned.

[30] Foreign Application Priority Data

Oct. 12, 1971 [DE] Fed. Rep. of Germany ... 7138603[U]

[51] Int. Cl.² .............................................. B01D 21/16
[52] U.S. Cl. ........................................ 210/49; 210/51; 210/84; 210/202; 210/208; 210/252; 210/522; 210/527
[58] Field of Search ........................ 210/42, 49, 51, 83, 210/84, 201, 202, 207, 208, 319, 521, 522, 527, 252

[56] References Cited

U.S. PATENT DOCUMENTS

| | | | |
|---|---|---|---|
| 3,067,878 | 12/1962 | Genter et al. | 210/521 |
| 3,410,412 | 11/1968 | Fechter | 210/527 |
| 3,552,554 | 1/1971 | Olgard | 210/521 |
| 3,635,346 | 1/1972 | Zuckerman et al. | 210/208 |
| 3,779,910 | 12/1973 | Chatfield | 210/49 |

Primary Examiner—Frank A. Spear, Jr.
Assistant Examiner—Benoit Castel
Attorney, Agent, or Firm—Larson, Taylor and Hinds

[57] ABSTRACT

Liquid to be treated flows into a combined sedimentation and thickening tank. The upper part of this tank is a sedimentation zone in which the liquid passes through parallel flow paths between downwardly inclined separator plates below which the solids fall to the bottom of the tank into the thickening zone whereat the solids are stirred and removed by a suitable stirring and scraping device. The liquids flowing with the solids through the parallel paths are removed at the end of said paths and delivered directly to the top of the sedimentation zone thus leaving the thickening zone essentially flow-free. Flocculants may be added to the water to be treated in a separate flocculation compartment arranged upstream from the sedimentation compartment. A separate destabilization compartment may be provided upstream from the flocculation compartment. A square sedimentation zone may merge smoothly into a circular thickening zone. The thickening zone may extend beneath the flocculation compartment for compactness. The scraping and stirring device may be rotatable or movable along a straight path.

26 Claims, 5 Drawing Figures

METHOD AND APPARATUS FOR MECHANICALLY AND CHEMICALLY TREATING LIQUIDS

RELATED APPLICATION

This application is a continuation-in-part of copending application Ser. No. 296,775, filed Oct. 12, 1972 by the same inventors, and now abandoned.

BACKGROUND OF THE INVENTION

The invention relates to a method for providing mechanical and/or chemical treatment of water and/or waste water by way of sedimentation and thickening of the settleable solids contained therein. The invention further relates to apparatus to carry out this process. Methods for the treatment of water and/or waste water by mechanical and/or chemical means as a rule are characterized by separation of sedimentation and thickening. Both processes normally are subject to different determination of design rules.

As compared to thickening tanks which receive sludge from sedimentation basins, the latter usually require a surface area and volume 50 to 20 times larger than that of the thickening tanks. The basis for the determination of design of sedimentation stages is related to the requirements of effluent purity only. The necessary surface area depends on the specific settleability of the solids to be removed.

The term "thickening" refers exclusively to the process of maximum concentration of solids separated in the sedimentation phase in the sense of a preparatory step to economical, final dewatering and disposal. The most important part of the thickening process is based on fundamentally different factors as compared to sedimentation.

In general it may be assumed that in the mechanical and/or chemical treatment of water and/or waste water the sedimentation unit receives an amount of suspension per unit of time which is of a factor 20 to 100 times greater than that of the sludge volume introduced into the second stage thickener following the sedimentation stage. A thickening process as per the above definition, consequently, does not occur under conditions of sedimentation in conventional clarification units.

Both processes have in common that they are extraordinarily sensitive to hydraulic shock loads that always interfere with either sedimentation or thickening. Optimum process control cannot be attained without separating these two stages.

Depending on the specific requirements, the said processes may be combined with additional treatment steps, whereas in case of sedimentation the suspended, undissolved and/or colloidal pollutants are, in a suitable way, transformed into settleable matter.

Especially with respect to mechanical and chemical treatment of water and waste water, so-called sludge contact units are now being applied. These are specially designed for efficient sedimentation on the basis of the assumption that the settling speed of particles to be separated has to be increased for good efficiency. Suitable measures in this direction include addition of flocculants to the water and/or waste water as well as establishing the so-called sludge contact in which previously flocculated matter is mixed with raw water and flocculants in order to increase particle size of the solids in suspension.

Preparation of particles with a certain minimum settling speed is primarily required because of the fact that in the sedimentation zone of sludge contact units, like in other sedimentation systems, vertically or horizontally oriented flow patterns are being developed, which are more or less likely to interfere with the sedimentation of the flocks. Increasing flock size will, consequently, favor the settleability of pollutant solids and thereby increase the efficiency of the plant with respect to effluent quality.

Since the flocculation and sludge contact processes call for different turbulence conditions in the various treatment compartments of contact units; the conditions required for flocculation and destabilization may influence the sedimentation process. This is another reason why the thickening rate obtainable in sludge contact units in general is rather low. At the same time it is impossible to increase the hydraulic load on the sedimentation zone of a sludge contact plant to such an extent that the throughput relative to the effective surface space is higher than 2 to 5 $m^3$ of liquid per $m^2$ per hour. The sedimentation zone of a sludge contact plant requires in general 85% of the entire surface area of such systems.

If sedimentation and sludge removal are to be effective, a certain and minimum tank depth will be required. Therefore the load factor of conventional sedimentation tanks is kept relatively low as compared to the volume and surface space of the tank. Their degree of efficiency will not be optimized due to uncontrollable flow patterns forming inside the tank's settling zone. These uncontrollable sedimentation and flow conditions primarily account for the low solids concentration of separated sludge requiring sludge thickening prior to its further treatment. The sludge is usually thickened by mechanical means such as stirring devices in a separate thickening tank. Due to these reasons prior art apparatus of the described kind require much space while their initial cost is high and their efficiency not optimal.

In recent years, new high-efficiency sedimentation apparatus have been introduced comprising plates or tubes inclined relative to the horizontal plane and constituting a flow passage for the liquid to be separated. Their function is to shorten the settling paths. The sedimentation period is comparatively short, and the required space can be lowered.

Suggestions have been made for using such inclined plate or pipe separators for the sedimentation of activated sludges from biological treatment plants. However, the sludge settling in these bundled plates or pipes and sliding down their inner surfaces is not optimally thickened so that it requires some separate treatment too. In the case of counter-current apparatus of the described kind the sludge is therefore collected at the lower ends of the plates or tubes and taken by the way of conveying means to a separate thickener which it enters at definite point, so that it has to be distributed throughout the thickener. This leads to undesirable turbulences and dilution delaying the process; as a result, cost and space requirements increase.

SUMMARY OF THE INVENTION

Thus, it is a purpose of the present invention — while increasing the efficiency of sedimentation and thickening stages — to provide a process of the described kind with greatly reduced space requirements and a minimum of conveying, regulating and control means while circumventing the described disadvantages.

It has been found that this purpose can be achieved to a great extent by using the essentially familiar type of concurrent separators having parallel plates or tubes and by subjecting the sediment issuing from the lower parts of the said separators in the form of uniformly distributed particles to a thickening process without interposing any conveying means or other means unsettling the process by their turbulent flow patterns.

The method according to the invention is therefore characterized in dividing the liquid to be treated in a first upper (sedimentation) zone into numerous parallel partial streams flowing through horizontally inclined channels, on the surface of which the deposit settles and passes downwards withdrawing said deposit from the lower channel ends by distributing it uniformly over a second lower zone (thickening zone) arranged immediately adjacent the lower channel ends, and thickening the solids by mechanical means, such as stirring arms.

This method avoids any transportation, dilution and turbulence of the sludge particles on their way from the sedimentation to the thickening zone; it likewise results in an optimal thickening of sludge particles due to their uniform distribution over the space of the thickening zone and their vertical delivery into that zone, so that the thickening zone, which is increased in efficiency, may be kept much smaller than any conventional thickener known heretofore. At the same time the use of concurrent parallel plate or tube separators will reduce the size of the sedimentation zone so that its space requirements are equal to those of the thickening zone. By arranging the sedimentation zone directly above the thickening zone additional space requirements are avoided and undesirable flow patterns issuing from the sedimentation zone and interfering with the concentration of solids are eliminated, which would not be the case in counter-current type settling units with or without plate separators.

Optimum simultaneous sedimentation and thickening is achieved within the smallest possible area and during a very short treatment period as compared to conventional systems of the described type. It is an additional advantage of the present invention that even sudden changes of load in the sedimentation zone do not affect the thickening process. Furthermore, the thickening zone itself, because of its favorable operational features, may receive from 3 to 10 times the load received in conventional systems, depending on the structure of solids to be separated. This results in an increased capacity of the entire system of handling excessive solids loads.

The process is preferably such that the liquid is introduced into and removed from the sedimentation zone only, so that no flow patterns may occur in the thickening zone.

In the conventional inclined plate or tube separators as used to handle the slurry from an activated sludge plant, the suspension enters at the lower end of the separators. The clear liquid ascends in said units, while the sedimented solids move countercurrently towards the bottom of said channels. The ascending flow and the downwardly oriented solids sediment counteract each other in such a way that only such solids will settle out effectively whose sedimentation speed exceeds the flow velocity of the ascending liquid. Application of this flow pattern to the present invention would result in the additional disadvantage that the suspension would have to be introduced into the thickening zone where it would interfere with the thickening of sludge solids and with the uniform sludge influent into said zone. According to a preferred embodiment of the present invention the process takes place in such a manner that the influent liquid is guided concurrently with the sedimented sludge solids through the channels from the upper to the lower ends thereof and that the clear liquid leaves the channels at a point above the lower ends thereof. Within the flow channels of the sedimentation zone there are formed separators and downwardly turned end pieces promoting sedimentation and the downward movement of sedimented sludge solids, the end portions of the channels not being flow passages, so that the sludge slides out of said end portions and is gravity-fed into the thickening zone.

A device for realizing the method of the invention is characterized by a thickening tank equipped with mechanical stirring devices and by several inclined plate or tube separators arranged above the said thickening tank so that the lower sludge delivering ends of the separators guide the sludge directly into the thickening tank, and that the lower ends of the separators are distributed over a large part of the surface space over which the lower ends of the separators are distributed is 50 to 100 percent of the surface of the thickening tank. In a preferred embodiment of the invention the inlets for the liquid to be treated and the outlets for the treated liquid are arranged above the upper surfaces of the separators thus being outside of the thickening tank.

As stated earlier, these sedimentation and thickening processes take place with advantage after treatment steps which effect or promote flocculation. In a preferred embodiment of the invention the method is therefore performed in such a way that before the liquid is divided into numerous streams the solid and the colloidal dissolved pollutants are destabilized by addition of chemicals. Thereafter flocculation takes place under suitable turbulence conditions.

According to the invention the new and improved device has a tank, the upper compartment of which includes the inclined plate separators being combined with a separate compartment for destabilizing the pollutants and — if desired — with another separate compartment for flocculation. This combination according to the invention not only separates destabilization from flocculation of solids but also the latter two processes from sedimentation and thickening. Hence different flow patterns prevailing in the separate zones do not interfere with one another but can be made to satisfy the different requirements of each process. Moreover, retention times can be selected to differ by approximate dimensioning of the individual compartments so that the best possible results can be obtained with flocculation aids and destabilization agents.

According to one embodiment of the invention, both the flocculation and the destabilization compartments may be equipped with at least one stirring element driven by a separate drive unit to ensure homogenous mixing of chemical additives with the incoming liquid.

For best results with sludge flocs, the sedimentation compartment is provided with separator plates which combine good separating performance with a high degree of efficiency and which require very little space as compared to conventional settling tanks. If, in addition, the inclined separator plates are provided with outlets for direct withdrawal of clean liquid above the level of their lower sludge ports, the sludge flocs flow in the same direction as the water down the surface of the inclined plates and, upon withdrawal of clean water, they slide into this thickening compartment without causing any undue turbulence. The thickening compartment is disposed underneath the separator plates. Here the sludge, while being increasingly thickened, gradually descends to the tank bottom and into the sump from where it is withdrawn by pumping means.

Thus, it is an object of this invention to provide a new and improved method for treating waste water by the mechanical and chemical technique wherein liquid flow conditions throughout the tank are optimized.

It is another object of this invention to provide a new and improved apparatus for the combined mechanical and chemical treatment of waste water.

It is another object of this invention to provide a new and improved method for the sludge contact waste liquid treatment technique wherein a sedimentation zone and a sludge thickening zone are provided within the same tank, there being provided separator plates for movement of the solid material through the sedimentation zone, and wherein the liquid passing between the plates is removed at the lower ends thereof as the solids are discharged from the lower ends thereof toward the thickening zone.

It is another object of this invention to provide a new and improved apparatus for mechanically and chemically treating waste water, according to which the solid material to be separated, after having been treated with flocculation aids, is delivered between parallel plates in a sedimentation zone, the solids then falling into a thickening zone and the clean liquid being removed.

It is another object of this invention to provide a compact apparatus of the type described for treating waste liquid by the mechanical and chemical process and including a sedimentation zone, a treatment zone, a flocculation zone and possibly also a destabilization zone.

Other objects and the advantages of the present invention will become apparent from the detailed description to follow, together with the accompanying drawings.

BRIEF DESCRIPTION OF THE DRAWINGS

There follows a detailed description of preferred embodiments of the invention which are provided merely for purposes of illustration, and in which.

DETAILED DESCRIPTION OF THE PREFERRED EMBODIMENTS

Figure 1:
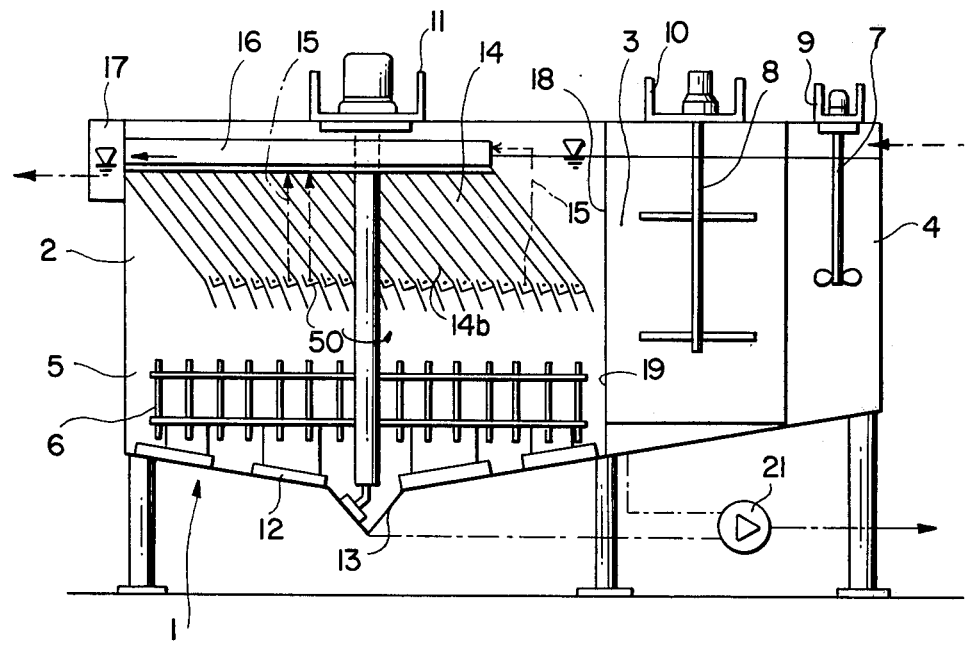
FIG. 1 is a vertical sectional view through a waste water treatment apparatus constructed in accordance with the features of the present invention.

Referring now to the drawings, like elements are represented by like numerals throughout the several views.

Figure 2:
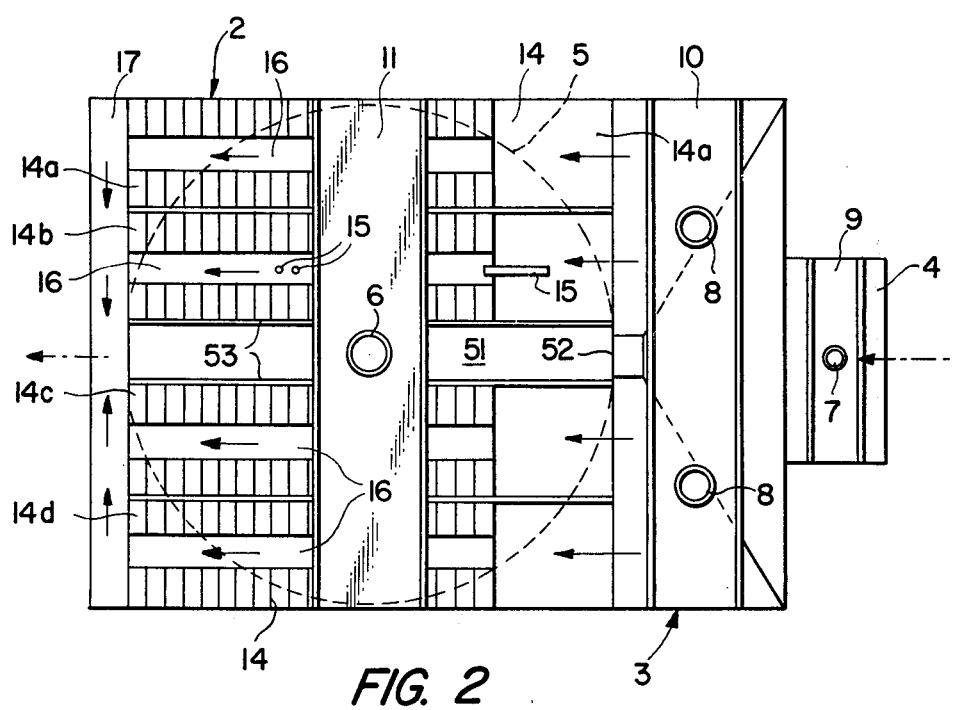
FIG. 2 is a plan view of FIG. 1.

Referring first to FIGS. 1 and 2, there is shown a treatment tank 1 having a sedimentation compartment 2, a flocculation compartment 3, a destabilization compartment 4, the compartments 2, 3 and 4 being arranged adjacent each other in a generally rectangular tank, and a thickening compartment 5 disposed below the sedimentation compartment 2. In this embodiment the thickening compartment 5 has a circular cross-section so as to facilitate the installation of a rotating stirring and scraping device 6 including sludge scraper blades 12 which scrape sludge material into the sludge sump 13, from which sludge is removed by means of sludge pump 21. The sides of the rectangular sedimentation compartment 2 and the circular thickening compartment 5 are constructed so as to merge smoothly into one another.

The destabilization compartment 4 includes a stirring element 7 mounted on a suitable bridge structure 9 and the flocculation compartment 3 has a pair of stirring elements 8 mounted on a fixed bridge 10. A similar bridge 11 spans the tank containing the sedimentation and thickening compartments 2 and 5 and carries a vertical shaft which at its lower end has attached thereto the stirring and scraping device 6 for rotation about the axis of this vertical shaft.

The sedimentation compartment has therein several groups 14a–14d of inclined separator plates 14 or similar devices disposed parallel to one another with their inlet ends on top, whereas their lower sludge outlet ends are located immediately above the thickening compartment 5. The plates 14 of these separators are inclined downwardly toward the direction of the flow coming from the flocculation compartment 3 so that the inflowing liquid is deflected at the inlet by more than 90°. However, the plates may also be inclined in the opposite direction. The bottom ends of the separator plates are bent off, as shown in FIG. 1. Separators 50 are disposed at this bend to separate the water not containing flocs and to effect direct removal through outlet openings, thus avoiding undue turbulence in and below plates 14. The outlet openings of such separating plates are connected to pipes 15 leading upwards and discharging into horizontally arranged overhead liquid channels 16. The liquid level in these channels 16 and in the discharge channel 17 arranged beyond it relative to the level maintained in the flocculation and sedimentation compartments is regulated in such a manner as to permit the clean water to flow freely from the separators 50 into the collecting channels 16, 17. The flocculation compartment 3 and sedimentation compartment 2 are connected across a weir 18.

Liquid from the flocculation compartment 3 passes over weir 18 across to the inlet ends of the plate 14a, 14b, 14c and 14d. Between the plates 14b and the plates 14c there is provided a central zone 51 bordered on one side by a wall 52 and on its two long sides by walls 53, these walls being high enough to prevent liquid from flowing from above into this area 52. The shaft of the scraping and stirring device 6 also passes down into this zone 51.

A wall 19 between compartments 2 and 3 prevents heavier flocs from entering the sedimentation compartment 2. Rather, these heavy flocs settle directly in the flocculation compartment 3 where they collect on the sloped bottom thereof and are removed through an opening in the floor thereof by means of sludge pump 21.

The liquid to be treated is delivered from the right-hand end of FIG. 1 as indicated by the arrow at the upper righthand portion thereof into the destabilization compartment 4 and after treatment therein through an opening in the wall separating the compartments 3 and 4 into the flocculation compartment 3. After treatment therein, the liquid with the small flocs formed near the surface thereof (the largest flocs having fallen to the bottom of compartment 3) flow over the weir 18 into the sedimentation compartment 2. Clear liquid at the surface flows directly into channels 16 and therealong in the direction as indicated by the arrows in FIGS. 1 and 2 into the discharge channel 17 and out to the left as indicated by the arrow at the upper lefthand portion of FIG. 1. The liquid containing the flocs starts flowing down between the separator plates 14, some of this liquid flowing through the plates closest to the compartment 3. However, the flow across compartment 2 is such that the liquid containing the flocs to be separated flows evenly across the top of compartment 2 and then downwardly, preferably evenly distributed through the parallel flow paths between the parallel plates so that the solids which fall into the settling tank 5 are evenly distributed over its area. Towards the lower ends thereof as the solids have now built up to the point where they will settle out, the liquid is removed directly by means of separators 50 for delivery through pipes 15 directly into the channels 16. While only two of the pipes 15 are shown in the figures, it will be understood that a pipe 15 will be provided for each separator 50. Meanwhile the solid material falls out of the bottom openings between the plates down to the thickening compartment 5 where the solid material is thickened by stirring of the device 6 after which the sludge is removed by the scraping action of blades 12 scraping the solid sludge into the sump 13 from which the material is removed by means of pump 21.

Figure 3:
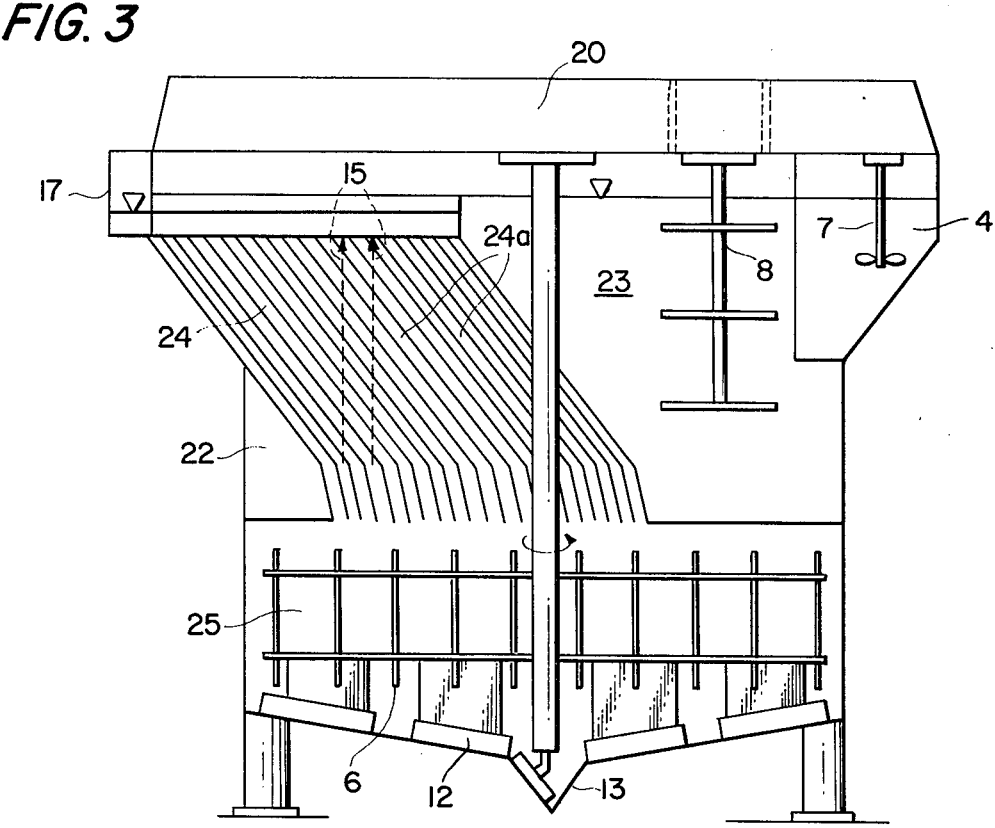
FIG. 3 is a longitudinal sectional view similar to FIG. 1 but showing another embodiment of the invention.
Figure 4:
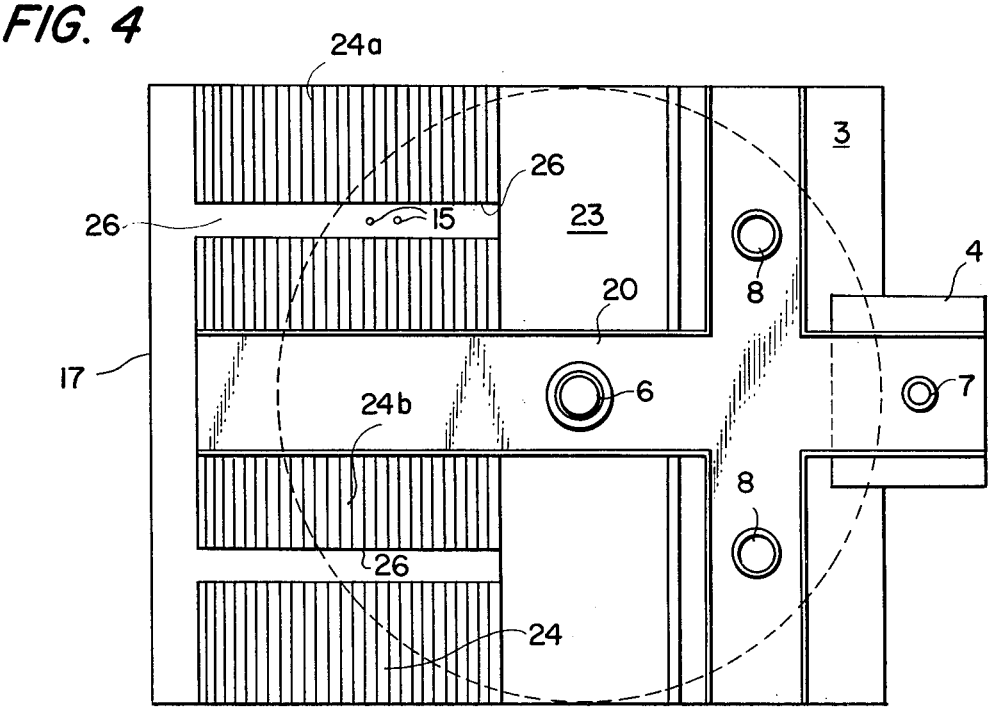
FIG. 4 is a plan view of FIG. 3.

The embodiment according to FIGS. 3 and 4 differs from the above described embodiment of FIGS. 1 and 2 in that the whole flocculation compartment 23 is arranged above a portion of the thickening compartment 25 and for the most part borders on the sedimentation compartment 22. The compartment 23 is rectangular, the deeper section of which houses the stirring units 8 and the shallower section of which extends above the upper ends of the separator plates 24. The destabilization compartment 4 lies partly above the flocculation compartment 23 and thickening compartment 25 respectively. The result is a very compact unit. The stirring and scraping devices are carried by a single cross-shaped bridge 20 from where the quality of the clarified water leaving through channels 26 can be checked.

The embodiment of FIGS. 3 and 4 differs in certain other minor respects from the embodiment of FIGS. 1 and 2. In this case, the pipes 15 of the plates 24 on the righthand side cannot lead directly upwardly because of interference with the flocculation compartment 23. In this case, these pipes 15 must follow a move devious path, not shown, to the collection channels 26. The embodiment of FIGS. 3 and 4 also includes a central section 51 void of plates and through which the shaft of stirring and scraping device 6, 12 extends. This section 51 is hidden by the enlarged bridge 20 in FIG. 4. Actually, in this embodiment of shaft of device 6 extends down through the compartment 23 and through the slanted lower left wall thereof (as viewed in FIG. 3) and then into the section 51 down between the plates 24a and 24b.

Figure 5:
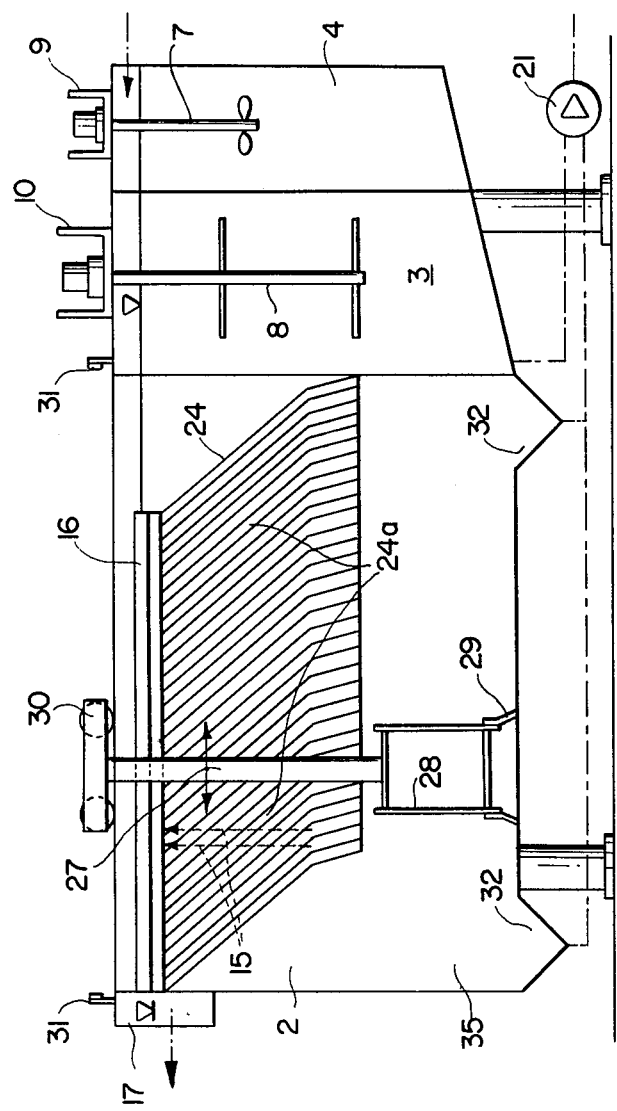
FIG. 5 is also a longitudinal sectional view similar to FIGS. 1 and 3 but showing still another embodiment of the invention.

FIG. 5 shows in longitudinal section a further variation of the embodiments of FIGS. 1 and 2. In this case the thickening compartment does not have a circular but a rectangular cross-section which is identical with that of the sedimentation compartment 2, so that the walls of these compartments are co-extensive with each other, there being no sloping surfaces whatsoever. This rectangular or square thickening compartment 35 is equipped with stirring means 28 and scraping means 29 attached to a structure 27 which in return is supported on a bridge-type structure 30 reciprocating on the tank crown. The scrape blades are double-edged so the tank can be scraped in both directions. Stops 31 for the traveling structure 30 prevent the stirring device 28 and scraping device 29 from hitting the tank walls and being damaged. Being scraped in both directions, the thickening compartment 35 is provided with sludge collecting troughs 32 at both front ends, the sludge being withdrawn from these troughs by pumping means 21.

The rectangular cross section of the thickening compartment not only lacks sloped surfaces merging with the sedimentation compartment but also makes better use of available space, which is a considerable advantage. Besides, a rectangular tank is less expensive than a partly circular, partly rectangular one. All these advantages are independent of whether or not a sedimentation compartment is provided above the thickening compartment and whether or not the separator as depicted is replaced by other separation means or processes. The stirring and scraping devices operating in a longitudinal direction inside the rectangular tank are another asset in that they are independent of where and how the sludge to be thickened accumulates.

In other respects, the embodiment of FIG. 5 is similar to that of FIG. 1. For example, extending across the width of the compartment 2 there can be four sets of separator plates 24a through 24d, only 24a being visible in the drawings. And of course there would be a central section such as 51 void of separator plates, the structure 27 would move as the structure moved longitudinally through the tank.

The operation of the apparatus is as follows: the water or waste to be treated arrives in the destabilization compartment 4 where it is normally mixed with hydrolizing metal salts such as iron (III) chloride, aluminum sulfate or polymeric cationic polyelectrolytes. The pH value may be adjusted in the same compartment by addition of an adjusting or standardizing agent, as the case may be. The mixture thus obtained leaves the destabilization compartment 4 in the direction of the flocculation compartment at which settleable flocs will form and where flow conditions are entirely different from those prevailing in the destabilization compartment 4. Retention time in these two compartments depends normally on the requirements of the respective process.

The flocs-water mixture leaves the flocculation compartment to enter the sedimentation compartment where the inclined separator plates are arranged. The mixture enters the latter from above and flows down together with the settling flocs, the flow being unidirectional. The cleaned water is withdrawn through plates 15 and the flocs gradually sink down to the thickening compartment.

The conditions are such that practically no turbulence will develop below the inclined separator plates 14, 24 and such that the settleable solids move into the thickening compartment without any serious interference therein. Because of the above described sedimentation process, the separated flocs issuing from the separator plates and spreading over 80% of the tank floor can enter the thickening compartment below the sedimentation compartment in a very steady manner. The thickening compartment is layed out according to the dimensional requirements of familiar sludge thickening equipment and permits optimum concentration of the solids separated in the sedimentation zone.

The thickened sludge is withdrawn by pumping means 21 from the centrally arranged conical sludge sump 13 or from the two sludge collecting troughs 32 of the thickening compartments. In order to replenish the turbid water in the thickening tank in proportion to the sludge volume withdrawn per time unit, a certain quantity of water is continuously withdrawn from the upper sedimentation compartment without harm to the sedimentation process. This results in an exchange of the liquid above the thickening sludge and prevents the digestion of the turbid water below the separators.

A treatment plant according to the combined mechanical and chemical method requires 6 to 12 times less space than a conventional sludge contact plant, depending on whether it is used for treating waste water or water; the conventional sludge contact plant not permitting the required separation of destabilization, flocculation and sedimentation processes.

Although the invention has been described in considerable detail with respect to preferred embodiments thereof, it will be apparent that the invention is capable of numerous modifications and variations apparent to those skilled in the art without departing from the spirit and scope of the invention.

We claim:

1. A method for mechanical or mechanical-chemical treatment of liquids containing settleable solid pollutants therein by means of flocculation sedimentation and thickening of the settleable solid pollutants therein, leaving separated essentially solid-free liquid, comprising the setps of: destabilizing and aiding flocculation of the said liquid, and then dividing the liquid to be treated in a first sedimentation zone into a plurality of parallel flow paths in the form of channels which are downwardly inclined, flowing said liquid through said channels and settling out the said solid pollutants as the liquid flows through the channels, discharging the solid pollutants from the bottom of said flow paths so that they fall in a uniformly distributed manner downwardly into a second zone which is a thickening zone, removing the separated solid-free liquid from a lower portion of said channels to substantially minimize the flow of liquids below the channels so that the discharged solid pollutants can fall to the bottom of the thickening zone with a minimized liquid flow within the thickening zone, thickening the solid pollutants which have fallen into the thickening zone with mechanical means located in the thickening zone and positioned to contact the solid pollutants as they fall therethrough, and removing the thickened solid pollutants out of the said thickening zone with a removing means separate from the thickening means and located below the thickening means.

2. The method of claim 1, wherein the flow of liquid being treated downwardly through the parallel flow paths is substantially equal to the flow of the said solid-free liquid which flow directly to the top of the sedimentation zone.

3. A method according to claim 1, including aiding flocculation of the liquid in a separate flocculation compartment upstream from the sedimentation zone after which said aided liquids are passed into the sedimentation zone.

4. A method according to claim 3 including destabilizing the liquids in a separate destabilization compartment upstream from the flocculation compartment and then passing said destabilized liquids from the destabilization compartment into the flocculation compartment.

5. An apparatus for mechanical or mechanical-/chemical treatment of liquids containing settleable solid pollutants by flocculation, sedimentation and thickening of solid settleable pollutants contained therein, leaving separated essentially solid-free liquid, comprising: a treatment tank having an upper compartment and a lower compartment, the lower compartment being located beneath the upper compartment and in open communication therewith, said upper compartment being a sedimentation compartment including a plurality of downwardly inclined channels, means for introducing the liquid to be treated into said channels and flowing the liquid therethrough, means for separating out said solid pollutants from the liquid being treated as the liquid being treated flows through the channels, means for removing the said solid-free liquid from a lower portion of the channels for substantially minimizing liquid flow below the channels, and means for discharging the said solid pollutants from the lower ends of the channels such that they fall under gravity into the lower compartment under said minimized liquid flow conditions existing thereat, and the lower compartment being a thickening compartment in which thickening of the said settled solid pollutants takes place, the thickening compartment including a mechanical means for engaging the solid pollutants falling into the thickening compartment as the pollutants fall therethrough to further thicken the same, wherein the bottoms of the channels are arranged and distributed above said thickening compartment in such a manner that the lower ends of the channels run directly into said lower compartment over a major part of the area of the top of said lower compartment and a removing means separate from the thickening means and located below the thickening means.

6. An apparatus according to claim 5, wherein said area over which the lower ends of the channels are distributed is 50 to 100 percent of the surface of the thickening compartment.

7. An apparatus according to claim 5, including a flocculation compartment separate from said upper and lower compartments and arranged upstream from the upper compartment and including opening means for allowing liquid to flow from the flocculation compartment to the top of the said upper compartment.

8. An apparatus according to claim 7, including a destabilization compartment separate from the other said compartments, and arranged upstream from said flocculation compartment, and including opening means for allowing liquid to flow from the destabilization compartment into the flocculation compartment.

9. An apparatus according to claim 8, including a stirring means in at least one of said flocculation and destabilization compartments.

10. An apparatus according to claim 7, wherein the said thickening compartment extends beneath essentially the entire flocculation compartment.

11. An apparatus according to claim 7, including a plurality of separator plates in said sedimentation compartment forming said channels, said plates being generally parallel to each other and inclined downwardly towards the flocculation compartment but terminating above said thickening compartment, whereby any liquid entering the top of the sedimentation compartment from the flocculation compartment must turn more than 90° to pass down between said separator plates.

12. An apparatus according to claim 11, said means for removing the solid-free liquid including outlet openings in the plates located above the lower ends thereof for removal of solid-free liquid from the space between the plates to the top of the sedimentation compartment.

13. An apparatus according to claim 12, including collection channels at the top of the sedimentation compartment for receiving solid free liquid and delivering the same to a liquid outlet, and including pipes leading from said outlet openings in the separator plates into the said collection channels for removal of said solid-free liquid.

14. An apparatus according to claim 7, including a common sludge suction pump means for removing solids from the bottom of the thickening compartment and the flocculation compartment.

15. An apparatus according to claim 7, said thickening compartment extending beneath said flocculation compartment, and including a destabilization compartment separate from the other said compartments and arranged upstream from the flocculation compartment and including an opening means for allowing liquid to flow from the destabilization compartment into the flocculation compartment, said flocculation compartment extending at least in part beneath said destabilization compartment.

16. An apparatus according to claim 5, wherein the sedimentation compartment is rectangular when viewed in plan, and wherein the thickening compartment is circular in cross-section when viewed in plan, these two compartments merging smoothly into one another.

17. An apparatus according to claim 5, including a plurality of separator plates inside the sedimentation forming the channels compartment and terminating above said thickening compartment.

18. An apparatus according to claim 17, including a flocculation compartment separate from said upper and lower compartments and arranged upstream from the upper compartment and including opening means for allowing liquid to flow from the flocculation compartment to the top of said upper compartment and wherein said plates are arranged generally parallel to each other and inclined from the vertical downwardly towards the said flocculation compartment.

19. An apparatus according to claim 18, said means for removing the solid-free liquid including means at the lower ends of the separator plates for separating out the solids which fall downwardly into the thickening compartment from the solid-free liquid and for raising the solid-free liquid upwardly to the top of the sedimentation compartment.

20. An apparatus according to claim 5, wherein both the thickening compartment and the sedimentation compartment have similar rectangular cross-sections when viewed in plan.

21. An apparatus according to claim 5, wherein the mechanical means in the thickening compartment includes a stirring and scraping means for stirring and scraping the solids settled therein.

22. An apparatus according to claim 21, including a flocculation compartment separate from said upper and lower compartments and arranged upstream from the upper compartment and including opening means for allowing liquid to flow from the flocculation compartment to the top of said upper compartment and wherein the said stirring and scraping means is carried by a bridge fixed above the upper compartment and extending over said flocculation compartment, and including stirring means in the flocculation compartment, said stirring means also being connected to said bridge.

23. An apparatus according to claim 21, in which the stirring and scraping means is attached to a movable bridge that travels back and forth such that the stirring and scraping means travels back and forth through said thickening tank which has a rectangular cross-section to stir and scrape the solid materials settled therein.

24. An apparatus according to claim 21, wherein said stirring and scraping means is attached to a central shaft and rotatable therewith about an axis, said shaft being located in the center of the thickening compartment which is circular in cross-section, said shaft extending upwardly to a bridge located above the sedimentation compartment.

25. An apparatus according to claim 5, said thickening compartment being rectangular, and said mechanical means including a stirring and scraping device movable linearly back and forth along the bottom of said thickening compartment to stir and remove settled solids therefrom into a pair of troughs located one at each of said thickening compartment.

26. An apparatus according to claim 29, including a common sludge pump for removing settled solids from the two said troughs.

* * * * *